(12) United States Patent
Wang et al.

(10) Patent No.: US 11,599,395 B2
(45) Date of Patent: Mar. 7, 2023

(54) DYNAMIC CORE ALLOCATION

(71) Applicant: VMware, Inc., Palo Alto, CA (US)

(72) Inventors: Yong Wang, Sunnyvale, CA (US); Mani Kancherla, Cupertino, CA (US); Kevin Li, Palo Alto, CA (US); Sreeram Ravinoothala, San Jose, CA (US); Mochi Xue, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 270 days.

(21) Appl. No.: 16/795,376

(22) Filed: Feb. 19, 2020

(65) Prior Publication Data

US 2021/0255903 A1    Aug. 19, 2021

(51) Int. Cl.
  *G06F 9/46*    (2006.01)
  *G06F 9/50*    (2006.01)
  *G06F 9/54*    (2006.01)

(52) U.S. Cl.
  CPC ............ *G06F 9/5083* (2013.01); *G06F 9/546* (2013.01)

(58) Field of Classification Search
  CPC .............................. G06F 9/5083; G06F 9/546
  See application file for complete search history.

(56) References Cited

U.S. PATENT DOCUMENTS

| | | | |
|---|---|---|---|
| 7,516,487 B1 | 4/2009 | Szeto et al. | |
| 7,734,895 B1 * | 6/2010 | Agarwal | G06F 8/52 |
| | | | 712/15 |
| 8,509,068 B2 | 8/2013 | Begall et al. | |
| 9,942,144 B1 | 4/2018 | Ramalingam et al. | |
| 10,778,721 B1 | 9/2020 | Holbrook et al. | |
| 10,833,992 B1 | 11/2020 | Dickinson | |
| 10,880,121 B1 | 12/2020 | Nirmala et al. | |
| 10,897,420 B1 | 1/2021 | Pianigiani et al. | |
| 2005/0066166 A1 | 3/2005 | Chin et al. | |
| 2008/0222730 A1 | 9/2008 | Ford et al. | |
| 2009/0016336 A1 | 1/2009 | LaVigne et al. | |
| 2009/0119750 A1 | 5/2009 | Sembugamoorthy et al. | |

(Continued)

FOREIGN PATENT DOCUMENTS

| | | |
|---|---|---|
| CN | 106059960 A | 10/2016 |
| CN | 109547502 A | 3/2019 |

OTHER PUBLICATIONS

Seddiki, M. Said, et al., "FlowQoS: QoS for the Rest of Us," HotSDN '14, Aug. 22, 2014, 2 pages, ACM, Chicago, IL, USA.

*Primary Examiner* — Tammy E Lee
(74) *Attorney, Agent, or Firm* — Adeli LLP (57) ABSTRACT

Some embodiments provide a method for updating a core allocation among processes of a gateway datapath executing on a gateway computing device having multiple cores. The gateway datapath processes include a first set of data message processing processes to which a first set of the cores are allocated and a second set of processes to which a second set of the cores are allocated in a first core allocation. Based on data regarding usage of the cores, the method determines a second core allocation that allocates a third set of the cores to the first set of processes and a fourth set of the cores to the second set of processes. The method updates a load balancing operation to load balance received data messages over the third set of cores rather than the first set of cores. The method reallocates the cores from the first allocation to the second allocation.

25 Claims, 9 Drawing Sheets

(56) References Cited

U.S. PATENT DOCUMENTS

| | | |
|---|---|---|
| 2009/0129271 A1 | 5/2009 | Ramankutty et al. |
| 2009/0161682 A1 | 6/2009 | Johnson et al. |
| 2009/0300759 A1 | 12/2009 | Wang et al. |
| 2010/0135287 A1 | 6/2010 | Hosain et al. |
| 2012/0051218 A1 | 3/2012 | Mohandoss et al. |
| 2012/0081580 A1 | 4/2012 | Côté et al. |
| 2013/0058229 A1 | 3/2013 | Casado et al. |
| 2013/0125120 A1 | 5/2013 | Zhang et al. |
| 2014/0052877 A1 | 2/2014 | Mao |
| 2014/0153422 A1 | 6/2014 | Nambiar et al. |
| 2015/0016286 A1 | 1/2015 | Ganichev et al. |
| 2015/0016469 A1 | 1/2015 | Ganichev et al. |
| 2015/0113133 A1 | 4/2015 | Srinivas et al. |
| 2015/0244630 A1 | 8/2015 | Madem et al. |
| 2015/0263899 A1 | 9/2015 | Fubaltsev et al. |
| 2015/0281277 A1 | 10/2015 | May et al. |
| 2016/0057166 A1 | 2/2016 | Chesla |
| 2016/0080211 A1 | 3/2016 | Anand et al. |
| 2016/0164910 A1 | 6/2016 | Tang |
| 2016/0218918 A1 | 7/2016 | Chu et al. |
| 2017/0118042 A1 | 4/2017 | Bhattacharya et al. |
| 2017/0149648 A1 | 5/2017 | Yang et al. |
| 2018/0091547 A1 | 3/2018 | Pierre |
| 2018/0157515 A1* | 6/2018 | Malloy ............... H04L 47/125 |
| 2018/0176181 A1 | 6/2018 | Fu et al. |
| 2018/0262599 A1 | 9/2018 | Firestone |
| 2018/0279161 A1 | 9/2018 | Chen et al. |
| 2018/0285151 A1* | 10/2018 | Wang .................. G06F 9/5083 |
| 2018/0309640 A1 | 10/2018 | Nagarajan et al. |
| 2018/0359134 A1 | 12/2018 | Pech et al. |
| 2019/0007330 A1 | 1/2019 | Browne et al. |
| 2019/0014051 A1 | 1/2019 | Briscoe et al. |
| 2019/0044809 A1* | 2/2019 | Willis ................ H04L 67/1002 |
| 2019/0081899 A1 | 3/2019 | Mundkur et al. |
| 2019/0108068 A1* | 4/2019 | Britkin ................ G06F 9/505 |
| 2019/0182367 A1 | 6/2019 | Kim et al. |
| 2019/0334868 A1 | 10/2019 | Tewari et al. |
| 2020/0278892 A1 | 9/2020 | Nainar et al. |
| 2020/0413283 A1 | 12/2020 | Shen et al. |
| 2021/0067489 A1 | 3/2021 | Jayawardena et al. |
| 2021/0176168 A1 | 6/2021 | Eckert et al. |
| 2021/0218677 A1 | 7/2021 | Wang et al. |
| 2021/0227424 A1 | 7/2021 | Wang et al. |
| 2021/0399920 A1 | 12/2021 | Sundararajan et al. |
| 2022/0070102 A1 | 3/2022 | Wang et al. |

* cited by examiner

DYNAMIC CORE ALLOCATION

BACKGROUND

Core allocation mechanisms are important in datacenters in order to maintain desired levels of performance. However, as data message burdens change over time, a static allocation of cores will be less than optimal at least some of the time. Methods of reallocating cores to different sets of processes often result in having to restart the processes. When the processes are for packet processing, frequent restarts can cause unacceptable interruptions.

BRIEF SUMMARY

Some embodiments provide a method for updating an allocation of processor cores of a gateway computing device among multiple processes of a gateway datapath that executes on the gateway computing device. Updating the allocations of the cores changes the number of cores allocated to the different type of processes that make up the gateway datapath. The different types of processes, in some embodiments, include (1) a set of data message processing processes that are run-to-completion processes (threads), each run-to-completion process executing on a single core in a set of cores allocated to the data message processing processes and (2) a set of other processes that are scheduled on multiple cores allocated to the other processes of the gateway datapath (e.g., each process can schedule threads on any allocated core and each core processes threads from multiple processes based on a scheduler).

In processing data messages, a gateway computing device executes a first set of datapath processing processes (e.g., threads) for data message input output (IO) operations and L4 services and a second set of other processes (e.g., threads) for additional functions (e.g., ARP learning, MAC learning, BFD, CLI, control plane functions, MP agent, aggregation services, dynamic routing daemon, ike daemon, load balancing daemons, etc.). Some embodiments of a gateway computing device implementation use a user-space network stack with cores of a virtual gateway computing device, or a bare-metal gateway computing device with cores split between the data message processing processes and the other processes. In some embodiments, a user-space network stack built on top of the data plane development kit (DPDK) does not support dynamic reallocation of cores between the two sets of threads without datapath restart, which is very disruptive. Accordingly, a method is provided that allows dynamic reallocation without datapath restart.

In some embodiments, the set of data message processing processes (threads) includes a process (thread) for each core that can be allocated to the set of data message processing processes (threads). The number of cores that can be allocated to the data message processing processes, in some embodiments, is one less than the total number of cores. Additionally, each core capable of being allocated to the set of data message processing processes (threads) is associated with a queue to which data messages are distributed by a load balancing operation (e.g., a hash-based load balancing mechanism that distributes data messages to the different cores of the processor by distributing the data messages to the queues). For cores not allocated to the set of data message processing processes (threads), the threads (and, in some embodiments, the queues) associated with the cores are inactive (parked) until the cores are reallocated to the set of data message processing processes.

The method collects utilization data from at least the cores allocated to the set of data message processing processes. In some embodiments, the method also collects utilization data from the set of cores allocated to the set of other processes. Additionally, or alternatively, data is collected regarding the type of data messages being received to project a utilization of cores in the set of cores allocated to the set of other processes. Based on the received utilization data, the method determines that one of the sets of cores is being underutilized (e.g., less than 50% aggregate utilization, less than 25% aggregate utilization). Based on the determination, a new allocation is identified, in some embodiments, that allocates a core from the underutilized set of cores to the other set of cores.

To update an allocation of cores to the identified new allocation, in some embodiments, the method (1) updates the load balancing operation to distribute data messages among a set of queues associated with the cores allocated to the set of data message processing processes in the identified new allocation and (2) reallocates the cores based on the identified new allocation. Depending on whether a core is added, or removed from, the set of cores allocated to the data message processing processes, the updating and reallocation are performed in different orders.

When a core is added to a set of cores allocated to the set of data message processing processes, the reallocation occurs before updating the load balancing operation so that the cores are available when the data messages are distributed to the newly added cores. In some embodiments, the reallocation includes activating inactive (parked) threads and updating the load balancing operation includes adding queues associated with the added cores to the queues available for the load balancing operation to which to direct data messages. When a core is removed from the set of cores allocated to the set of data message processing processes, updating the load balancing operation occurs before reallocating the cores. In some embodiments, updating the load balancing operation includes removing a set of queues associated with the cores to be removed from a set of queues available for the load balancing operation to which to direct data messages. The cores to be removed, and the associated data message processing threads, are used to process all the remaining data messages in the queues associated with the cores to be removed. Once the data messages are all processed, the threads are rendered inactive (e.g., are parked) and the cores are reallocated. In other embodiments, updating the load balancing operation includes redirecting data messages stored in queues associated with the cores to be removed to be processed by the cores that will remain allocated to the set of data message processing processes.

The load balancing operation, in some embodiments, is a receive side scaling (RSS) operation. In some such embodiments, updating the load balancing operation includes updating an RSS table to add or remove queues to which the RSS operation may distribute data messages.

In some embodiments, the monitoring is implemented as a process (thread) of the gateway datapath. In other embodiments, the monitoring is implemented as a separate application executing on the gateway computing device. In some embodiments, the utilization data provided to the monitoring process, or application, is provided through a control plane. In other embodiments, the gateway datapath provides the utilization data to the monitor and the monitor includes a scheduler that allocates the cores based on the received utilization data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for updating an allocation of processor cores of a gateway computing device among a plurality of processes of a gateway datapath that executes on the gateway computing device. The gateway datapath processes include a set of data message processing processes to which a first set of cores of the gateway computing device is allocated and a set of other processes to which a second set of cores of the gateway computing device is allocated. Utilization statistics are received from the first set of cores and a second allocation of cores is identified for the first and second sets of processes based on the utilization statistics. The second allocation allocates (1) a third set of cores to the set of data message processing processes that includes a different number of cores than the first set of cores and (2) a fourth set of cores to the set of other processes that includes a different number of cores than the second set of cores. Based on the second allocation, the method updates a load balancing operation that load balances received data messages over the first set of cores to a second load balancing operation to load balance received data messages over the third set of cores and reallocates the cores from the first allocation to the second allocation.

Figure 1:
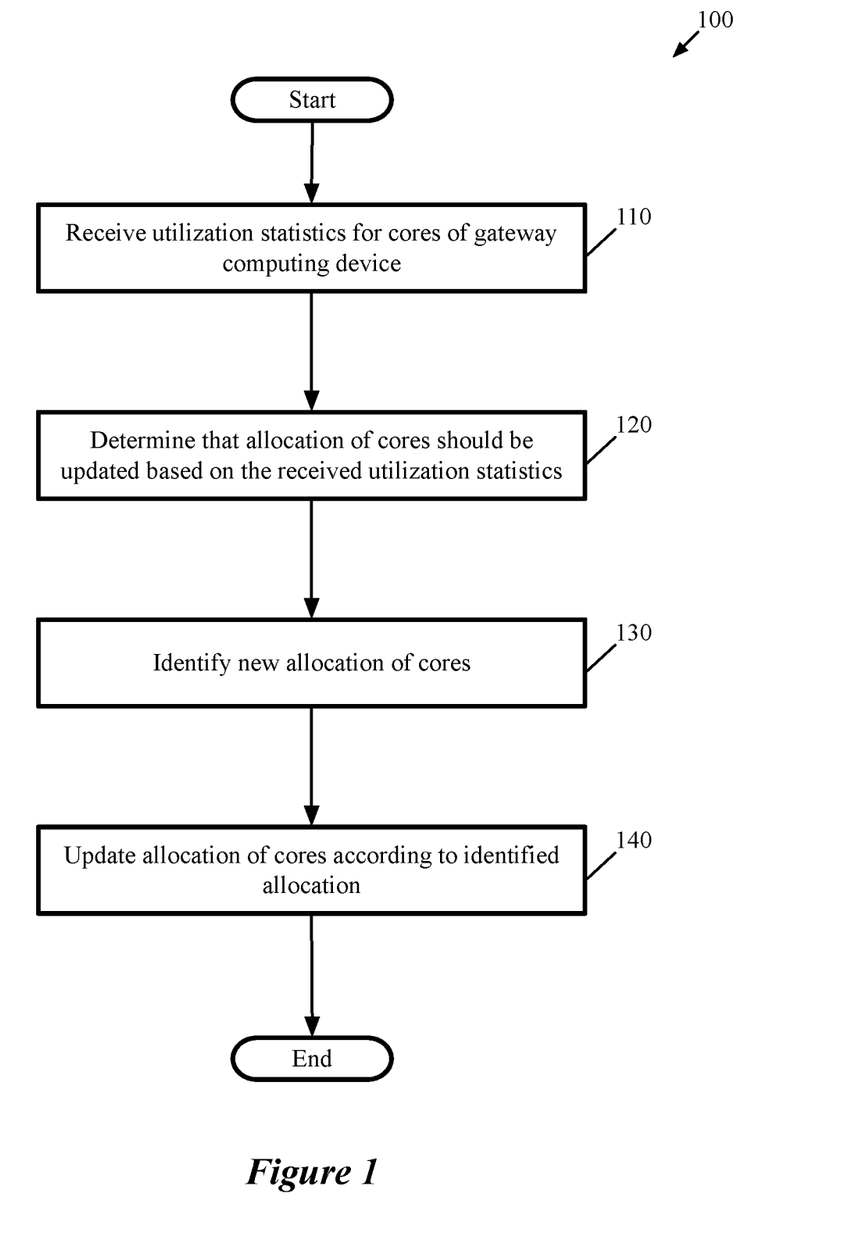
FIG. 1 conceptually illustrates a process for updating a core allocation based on core utilization statistics.

FIG. 1 conceptually illustrates a process 100 for updating a core allocation based on core utilization statistics. Process 100, in some embodiments, is performed by a monitor process that includes monitoring and control (e.g., scheduling) functions. In some embodiments, the monitor process is a process (e.g. thread) of the gateway datapath processes, while in other embodiments the monitor process is a separate application executing on the gateway computing device that is in communication with the gateway datapath processes. Process 100 begins by receiving (at 110) utilization statistics for cores of the gateway computing device allocated to the gateway datapath processes. The utilization statistics relate to cores allocated to a first set of data message processing processes. Some embodiments include utilization data for all cores allocated to the gateway datapath processes and other embodiments also include information regarding the type of data messages being processed (e.g., HTTPs, HTTP, IPSEC, ICMP, etc.).

Once the utilization statistics are received (at 110), the utilization statistics are used to determine (at 120) that the allocation of cores should be updated. For example, if the utilization statistics indicate that a set of four cores allocated to a first set of data message processing processes has an aggregate utilization rate of between 30%-50% while the set of four cores allocated to a second set of gateway datapath processes has an aggregate utilization rate above 90%, the process 100 determines that one core should be reallocated to the second set of gateway datapath processes from the first set of data message processing processes to provide more processing power to the second set of gateway datapath processes. If the utilization rates were reversed, one of ordinary skill in the art would appreciate that one core would be reallocated to the first set of data message processing processes. In some embodiments, if the aggregate utilization rates for each set of cores is below a threshold rate (e.g., 50%, 25%, etc.), some cores will be allocated to be unused to provide elastic capability for customers without paying for processing that they are not using.

After determining (at 120) that the core allocation should be updated, the process 100 identifies (at 130) a new allocation of cores between the different sets of gateway datapath processes. In some embodiments, the identification (at 130) of the new allocation is performed as part of the determination (at 120), but is separated here for clarity. The identification of the new allocation, in some embodiments, includes identifying a set of cores that should be reallocated from a first set of cores to a second set of cores. Along with identifying cores that should be reallocated, in some embodiments, queues and processing threads associated with the identified cores are identified. In some embodiments, identifying the new allocation also includes identifying changes that are required to a load balancing operation (e.g., an RSS table) such that the identified new allocation includes all the configuration changes required to implement the new allocation and an order of operations for the changes.

Once the new allocation is identified (at 130), the process 100 updates (at 140) the allocation of the cores according to the identified new allocation. Depending on the nature of the new allocation, the updating may have different steps or steps may be performed in different orders. The different updating processes are described below in relation to FIGS. 8-9, which conceptually illustrate updating processes for adding and removing cores from the set of cores allocated to the first set of data message processing processes. Once the core allocation is updated according to the new allocation, the process 100 ends.

Figure 2:
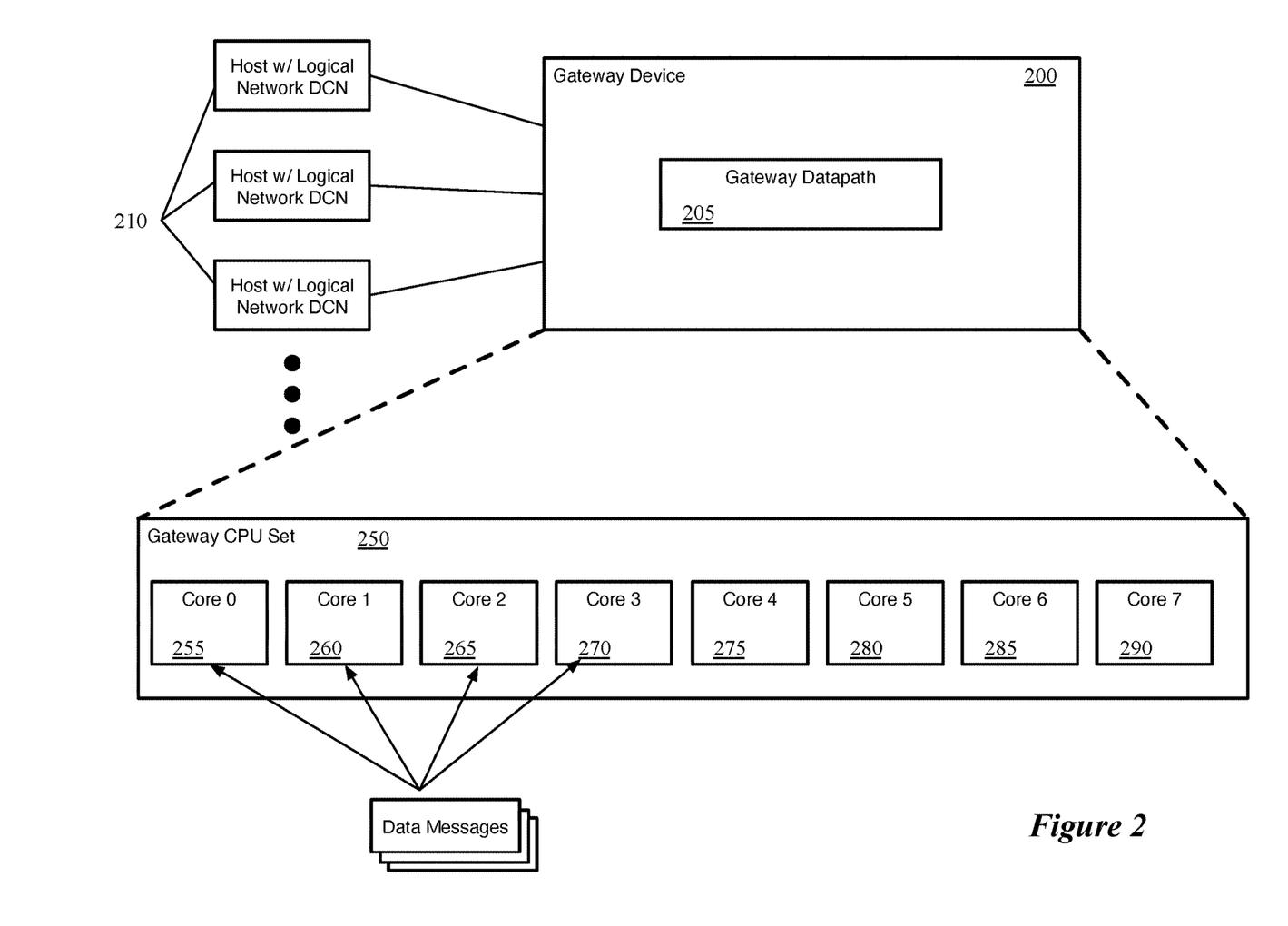
FIG. 2 conceptually illustrates a gateway device that executes a gateway datapath using a set of central processing units (CPUs).

FIG. 2 conceptually illustrates a gateway device 200 that executes a gateway datapath 205 using a set of CPUs 250. The gateway datapath 205, in different embodiments, may execute in virtualization software of the gateway device 200 (e.g., if the gateway device is a host computer that also hosts various DCNs) or as an application/daemon on a bare-metal device. As shown, various host computers 210 that host one or more logical network DCNs connect (through the physical network of the datacenter) to the gateway device 200. These logical network DCNs exchange data traffic with each other (which may not require processing by the gateway datapath 205) as well as with external endpoints.

Data traffic between the logical network DCNs and the external endpoints is transmitted through the gateway datapath 205 of the device 200. In some embodiments, at least for the first packet of a data flow in each direction, the gateway datapath 205 executes a multi-stage processing pipeline. Different ingress and egress processing pipelines are described in further detail in U.S. Pat. Nos. 9,787,605 and 10,084,726, which are incorporated herein by reference. At each stage, the gateway datapath 205 of some embodiments reads configuration data for the stage and performs processing according to said configuration data (e.g., to determine how to switch and/or route a data message, to perform load balancing and/or network address translation, etc.).

The gateway device 200 of some embodiments includes a network interface controller (NIC) via which data messages are sent and received (e.g., a NIC connected to an external router), and a set of processing units such as CPU set 250. Such a set of CPUs 250 may have multiple cores (e.g., 4, 8, 16, etc.) for processing data messages, with data messages load balanced between the cores (e.g., using receive side scaling [RSS] or another load balancing technique). CPU set 250 is shown having eight cores 255-290.

Ingress data messages received at the NIC are distributed across a set of the cores (e.g., 255-270) using a hash-based load balancing technique (e.g., RSS). In different embodiments, the CPU set 250 of the gateway device 200 may have different numbers of cores available to the gateway datapath 205 (e.g., more or less than the eight illustrated in FIG. 2), and different numbers of the available cores may be assigned for processing data messages. In some embodiments, the load balancing technique computes a hash value of various data message headers to distribute incoming data messages across a set of the cores allocated to the set of data message processing processes (cores 0-3, 255-270 as shown in FIG. 2).

In processing data messages, a gateway computing device executes a first set of datapath processing processes (e.g., fastpath threads) for data message input output (IO) operations and L4 services and a second set of other processes (e.g., slowpath threads) for additional functions (e.g., ARP learning, MAC learning, BFD, CLI, control plane functions, MP agent, aggregation services, dynamic routing daemon, ike daemon, load balancing daemons, etc.). Some embodiments of a gateway computing device implementation use a user-space network stack with cores of a virtual gateway computing device, or a bare-metal gateway computing device with cores split between the data message processing processes and the other processes. In some embodiments, a user-space network stack built on top of the data plane development kit (DPDK) does not support dynamic reallocation of cores between the two sets of threads without datapath restart, which is very disruptive. Accordingly, a method is provided that allows dynamic reallocation without datapath restart.

In some embodiments, the set of data message processing processes (threads) includes a process (thread) for each core that can be allocated to the set of data message processing processes (threads). The number of cores that can be allocated to the data message processing processes, in some embodiments, is one less than the total number of cores. Additionally, each core capable of being allocated to the set of data message processing processes (threads) is associated with a queue to which data messages are distributed by a load balancing operation (e.g., a hash-based load balancing mechanism that distributes data messages to the different cores of the processor by distributing the data messages to the queues). For cores not allocated to the set of data message processing processes (threads), the threads (and, in some embodiments, the queues) associated with the cores are inactive (parked) until the cores are reallocated to the set of data message processing processes.

Figure 3:
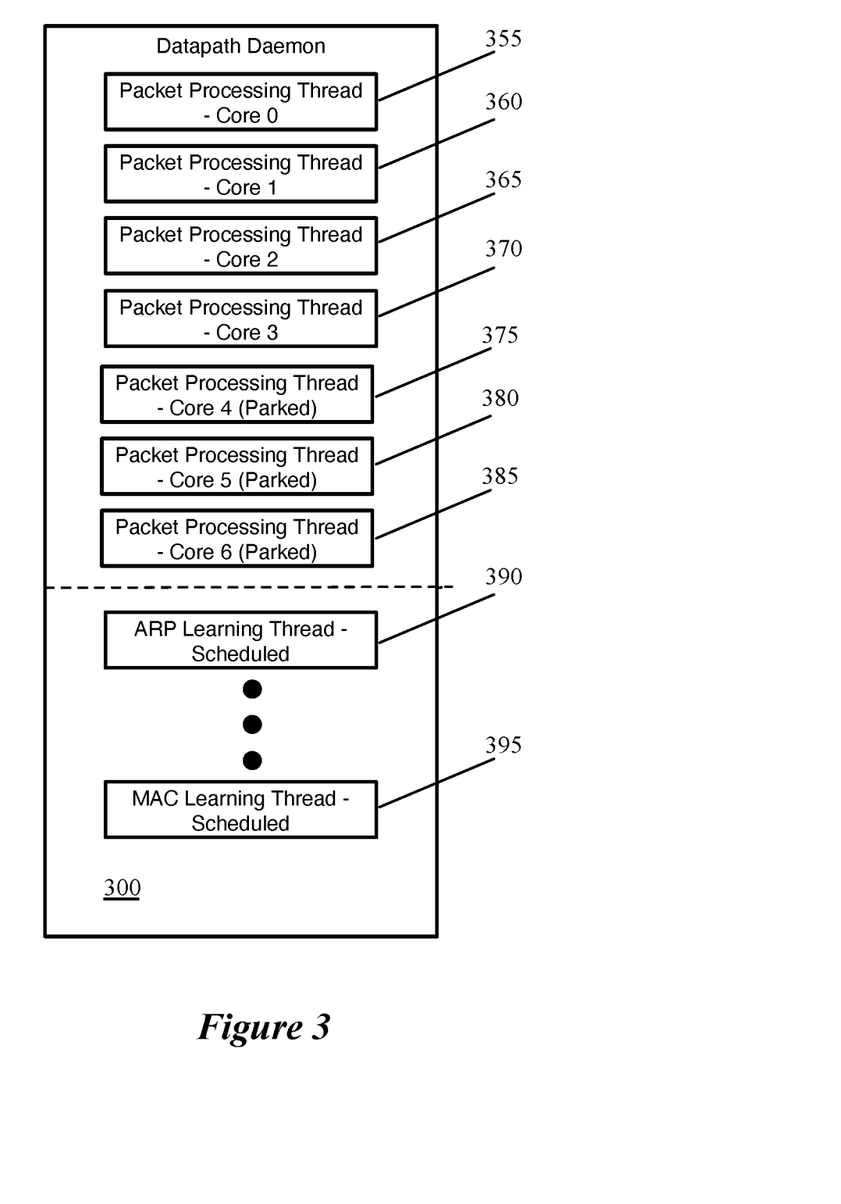
FIG. 3 conceptually illustrates data message processing threads and additional process threads executed by a datapath daemon of some embodiments.

FIG. 3 conceptually illustrates data message processing threads 355-385 and additional process threads 390-395 executed by a datapath daemon 300 of some embodiments. As mentioned, the gateway datapath is a daemon or other application that can execute in virtualization software of a host computer or on a bare-metal device. This daemon 300, in some embodiments, uses DPDK to provide accelerated data message processing using the NIC of the gateway device. As shown in FIG. 3, the datapath daemon 300 executes one data message processing (e.g., a packet-processing or fastpath) thread 355-385 for each core of the gateway computing device capable of being allocated to the data message processing processes. In some embodiments, these are run-to-completion threads that can process data messages simultaneously (i.e., each of the allocated cores can simultaneously process a data message). In addition, as mentioned above, each thread, and core, is associated with a queue for which it processes data messages. Threads 375-385 associated with three additional cores (e.g. cores 4-6 or cores 275-285) that could be, but are not currently, allocated to data message processing processes, are identified as parked (e.g., inactive) such that they are not currently running and their associated cores are available to process threads in the set of threads 390-395. For threads that are parked, some embodiments remove their associated queues from the load balancing (e.g., RSS) operation, while in other embodiments, the data messages in queues associated with inactive (e.g., parked) threads (e.g., threads 375-385) are processed by active threads (e.g., threads 355-370).

In addition, the datapath daemon 300 executes additional threads as well as threads for other purposes such as ARP learning, MAC learning, BFD, CLI, control plane functions, MP agent, aggregation services, dynamic routing daemon, ike daemon, load balancing daemons, etc. shown as ARP and MAC learning processes 390-395. In some embodiments, the other threads besides the packet-processing threads 355-385 are scheduled among the cores not assigned for packet processing (e.g., cores 275-290) as indicated by "scheduled" in the figure to indicate that they are not necessarily tied to a specific core before being scheduled. In some embodiments, the set of processes 390-395 also includes a monitoring and scheduling process for monitoring the utilization of cores and updating the allocation of cores as necessary.

Figure 4:
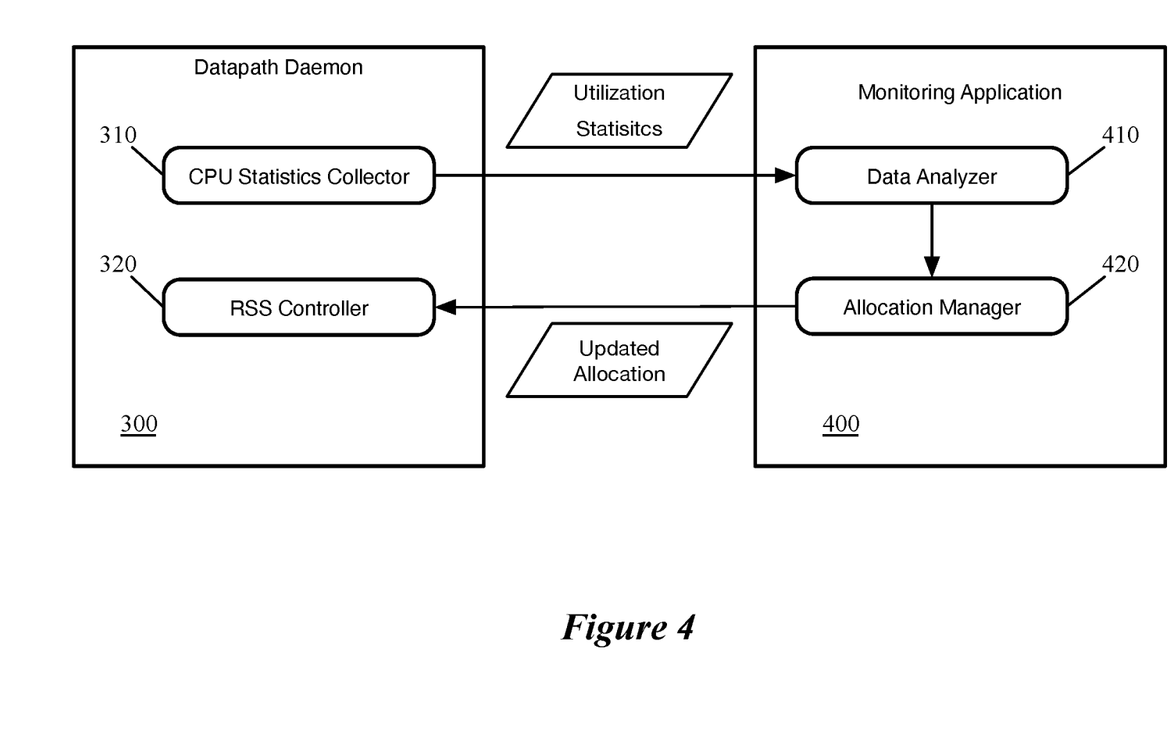
FIG. 4 conceptually illustrates components of a monitoring application for monitoring the utilization and updating the allocation of the cores as necessary.

FIG. 4 conceptually illustrates components of a monitoring application 400 for monitoring the utilization and updating the allocation of the cores as necessary. Although monitoring application 400 is depicted as a separate set of processes executing outside a datapath daemon 300, one of ordinary skill in the art will understand that the processes can be executed as processes of the datapath daemon 300. Monitoring application 400 is depicted as including at least a data analyzer 410 and an allocation manager 420. Data analyzer 410 receives CPU utilization statistics from the CPU statistics collector 310 which is a process (or set of processes) of datapath daemon 300 that collects utilization statistics, and, in some embodiments, additional information regarding the use of the cores. Data analyzer 410, in some embodiments, performs the operations 110-130 of process 100 to determine that an allocation should be updated and to identify a new allocation of cores.

The monitoring application 400 collects utilization data regarding at least the cores allocated to the set of data message processing processes. In some embodiments, the monitoring application 400 also collects utilization data from the set of cores allocated to the set of other processes. Additionally, or alternatively, data is collected regarding the type of data messages being received to project a utilization of cores in the set of cores allocated to the set of other processes. For example, HTTPS or IPSEC data messages that require decryption and re-encryption may place a larger burden on the cores allocated to the set of other processes (e.g., a set of slowpath threads [processes] besides the run-to-completion data message processing [e.g., fastpath] threads). Based on the received utilization data a data analyzer 410 determines that at least one of the sets of cores is being underutilized (e.g., less than 50% aggregate utilization, less than 25% aggregate utilization). Based on the determination, a new allocation is identified. In situations in which one set of cores is underutilized and the other set of cores is being utilized at or above a threshold rate, the new allocation allocates a core from the underutilized set of cores to the other set of cores. In other situations in which both sets of cores are underutilized, the new allocation allocates fewer cores to each set of cores (e.g., inactivates some of the cores).

After the data analyzer 410 identifies a new allocation, the allocation manager 420 implements the new allocation. In some embodiments, a system uses hierarchical Linux™ cgroups among which cores are allocated to the different sets. The hierarchical set of cgroups includes a "root" group with "shielded" and "generic" subgroups. The root group has access to all of the cores, while the cores associated with the shielded subgroup are accessible only to processes assigned to the shielded (or root) groups. The cores allocated to the generic subgroup are available for scheduling processes associated with the generic subgroup. The processes (threads) are associated with either the root group (which has access to the shielded cores) to give them access to all the cores (for the processes in the root group), or the generic group (for processes in the generic group). The datapath, in some embodiments, is assigned to the root group and both slowpath and fastpath threads are spawned by the main thread. When slowpath threads are spawned by the main thread, some embodiments place them in the generic subgroup so as to restrict their access to the shielded cores allocated to the fastpath threads. Implementing the new allocation, in such embodiments, includes allocating the cores to the cgroups according to the new allocation. One of ordinary skill in the art will appreciate that the above is a single example, and that there are many ways to implement the above allocation to different processes.

Implementing the new allocation, in situations in which the number of cores associated with the data message processing processes is changed in a new allocation, the allocation manager 420, in some embodiments, communicates with an RSS controller 320 to update an RSS table used to distribute data messages among the set of cores. For example, if a core is reallocated from the set of data message processing threads, a queue is removed from a list of available queues (e.g., an RSS table) associated with an RSS operation. On the other hand, if cores are reallocated to the set of data message processing threads, a queue is added to a list of available queues (e.g. an RSS table) associated with an RSS operation. One of ordinary skill in the art will appreciate that an RSS operation is merely one example of a load balancing operation that may be used to distribute data messages among the set of cores allocated to the set of data message processing processes.

Figure 5:
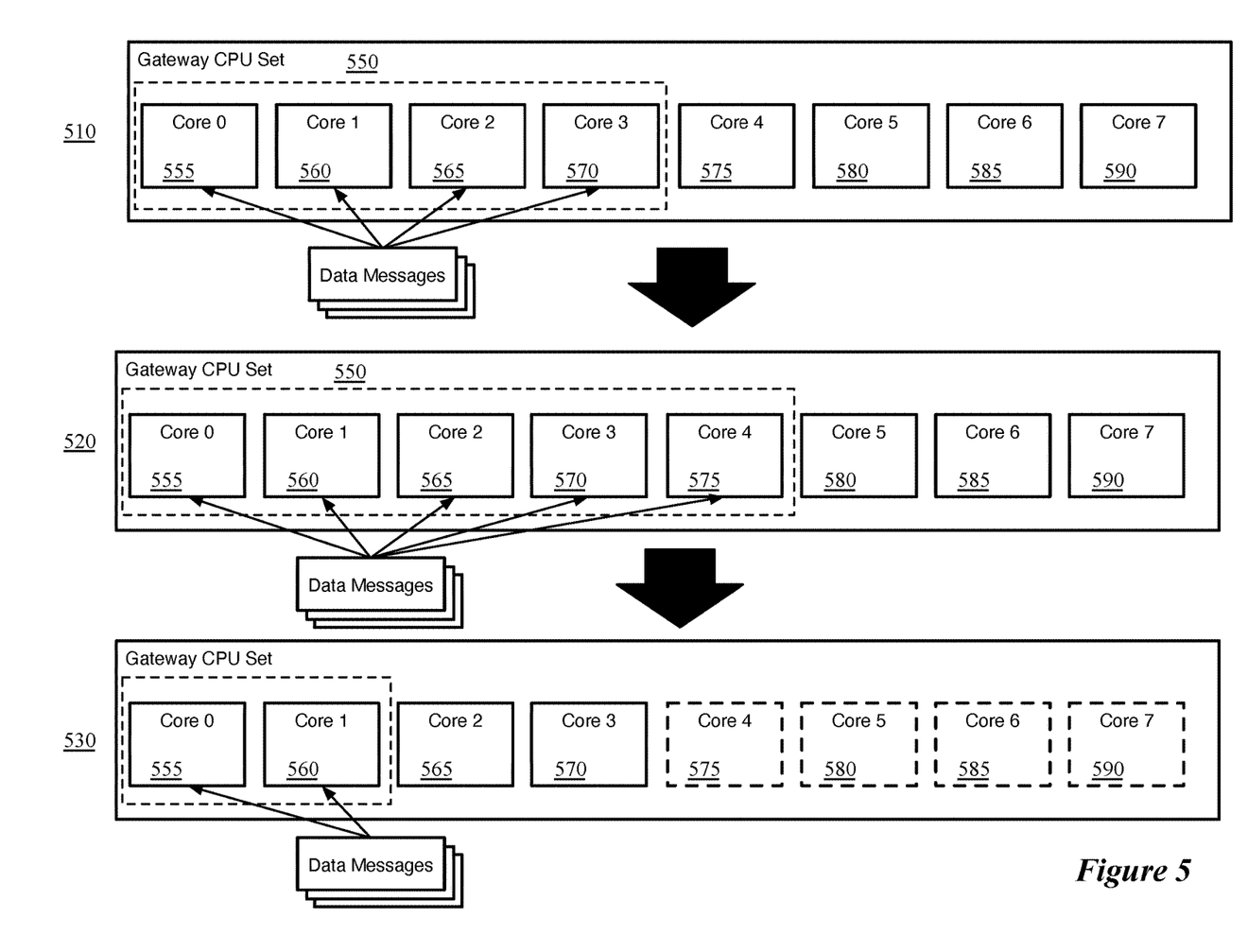
FIG. 5 illustrates a series of allocations that are made, in some embodiments, based on the process and the analysis described in relation to FIG. 4.

FIG. 5 illustrates a series of allocations 510-530 that are made, in some embodiments, based on the process 100 and the analysis described in relation to FIG. 4. In allocation 510 a set of four cores 555-570 are allocated to data message processing processes while the other set of four cores 575-590 are allocated to the other processes. Allocation 520 represents a new allocation utilizing cores 555-575 after it is determined that the set of cores allocated to the data message processing processes is utilizing the cores 555-570 above a threshold rate. while the other set of processes is utilizing the cores 575-590 below a threshold utilization rate. Allocation 530 represents an additional new allocation that allocates two cores 555-560 to the data message processing processes, two cores 565-570 to the other set of processes, while the remaining cores are 575-590 inactive. Allocation 530 may result from a determination that both sets of cores were being utilized at an aggregated rate below a lower threshold rate (e.g., 20% or 30%).

Figure 6:
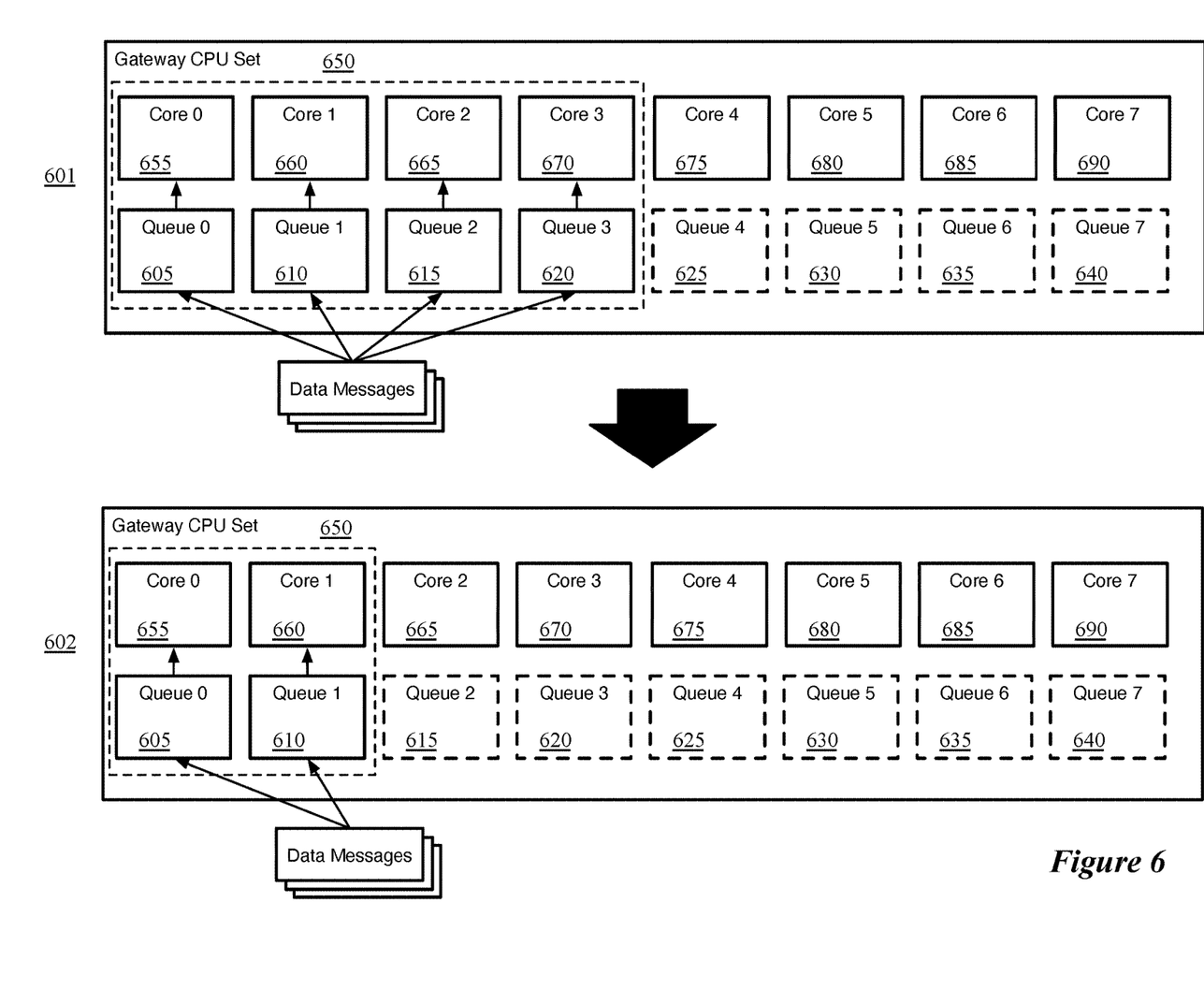
FIG. 6 illustrates a first reallocation of cores in a CPU set that includes the set of cores along with a set of queues.

FIG. 6 illustrates a first reallocation of cores in a CPU set 650 that includes the set of cores 655-690 (similar to cores 255-290) along with a set of queues 605-640 (in an embodiment in which each core is associated with a fastpath thread and queue). In allocation 601, the set of cores 655-670 are allocated to data message processing processes and the set of cores 675-690 are allocated to other datapath processes. In allocation 601, the queues 605-620 are active and are used to receive data messages that are passed to their associated cores 655-670, while queues 625-640 are inactive as their associated cores 675-690 are allocated to the other (e.g. slowpath) processes.

Allocation 602, which may result from a determination that the set of cores allocated to the data message processing processes are being utilized at an aggregate utilization rate that is below a threshold (e.g., below 20% or 30% utilization) while the other set of cores allocated to the other set of processes is utilizing the allocated cores above a threshold aggregated utilization rate (e.g., above 80% or 90% utilization). In allocation 602, cores 665 and 670 are reallocated to the other set of (slowpath) processes and their associated queues 715 and 720 are no longer used by the data message distribution operation and are inactivated (after being processed to completion as will be explained below in relation to FIG. 8).

Figure 7:
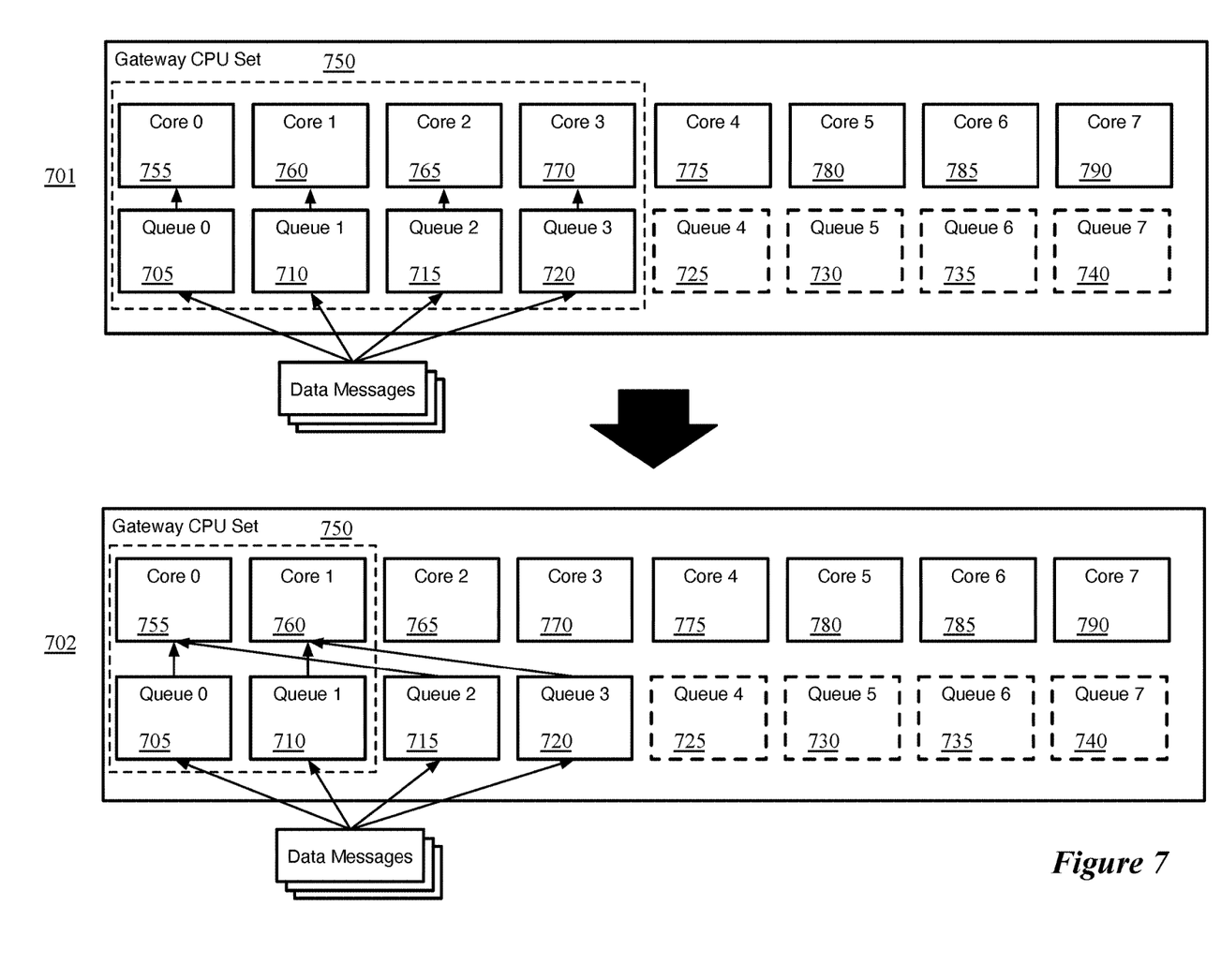
FIG. 7 illustrates a second reallocation of cores in a CPU set that includes the set of cores along with a set of queues.

FIG. 7 illustrates a second reallocation of cores in a CPU set 750 that includes the set of cores 755-790 (similar to cores 255-290) along with a set of queues 705-740 (in an embodiment in which each core is associated with a fastpath thread and queue). In allocation 701, the set of cores 755-770 are allocated to data message processing processes and the set of cores 775-790 are allocated to other datapath processes. In allocation 701, the queues 705-720 are active and are used to receive data messages that are passed to their associated cores 755-770, while queues 725-740 are inactive as their associated cores 775-790 are allocated to the other (e.g. slowpath) processes.

Allocation 702, which may result from a determination that the set of cores allocated to the data message processing processes are being utilized at an aggregate utilization rate that is below a threshold (e.g., below 20% or 30% utilization) while the other set of cores allocated to the other set of processes is utilizing the allocated cores above a threshold aggregated utilization rate (e.g., above 80% or 90% utilization). In allocation 702, cores 765 and 770 are reallocated to the other set of (slowpath) processes and their associated queues 715 and 720 are reprogrammed to have their data messages processed by the remaining cores 755 and 760 allocated to the set of data message processing processes. In such embodiments, by reassigning the data queues to be processed by different cores, the method ensures that the data messages are processed in order because the same data message flows are distributed to the same queues. This is as opposed to the previous solution which can lead to data messages in a same data message flow being processed by different queues before and after the reallocation which can lead to problems with out of order data message processing.

To update an allocation of cores to the identified new allocation, in some embodiments, the method (1) updates the load balancing operation to distribute data messages among a set of queues associated with the cores allocated to the set of data message processing processes in the identified new allocation and (2) reallocates the cores based on the identified new application. Depending on whether a core is added, or removed from, the set of data message processing processes, the updating and reallocation are performed in different orders.

Figure 8:
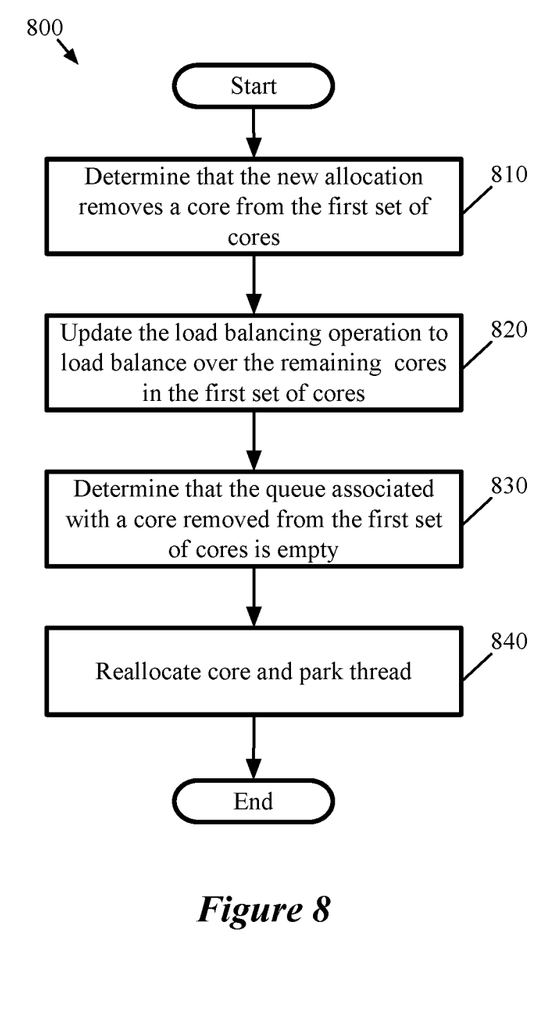
FIG. 8 conceptually illustrates a process for updating the allocation of cores when cores are removed from the set of cores allocated to the data message processing processes.
Figure 9:
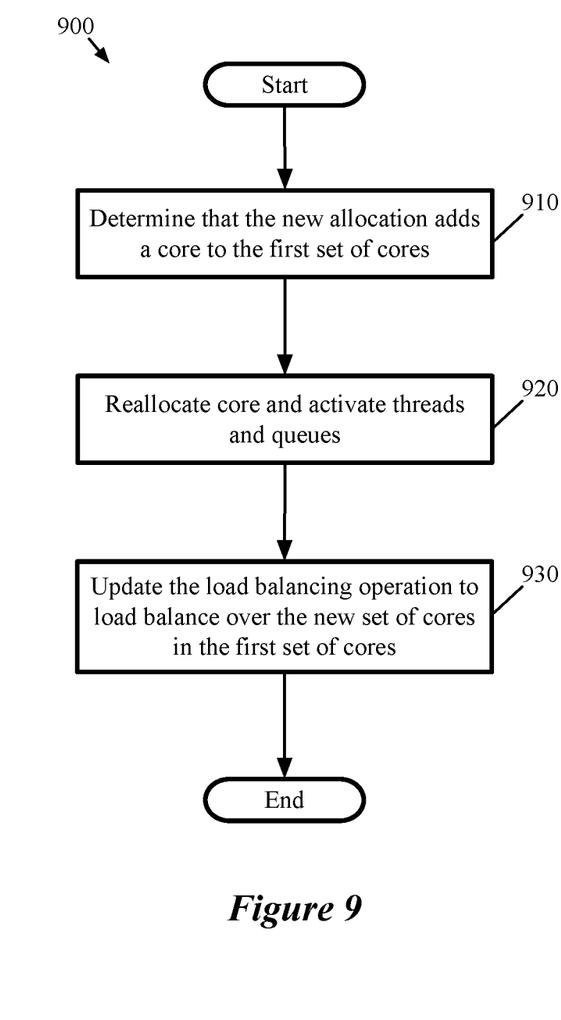
FIG. 9 conceptually illustrates a process for updating the allocation of cores when cores are added to the set of cores allocated to the data message processing processes.

FIGS. 8 and 9 conceptually illustrate processes 800 and 900 that, for different situations, correspond to operation 140. FIG. 8 conceptually illustrates a process 800 for updating the allocation of cores when cores are removed from the set of cores allocated to the data message processing processes. The process begins by determining (at 810) that the new allocation removes a core from the first set of cores allocated to the set of data message processing processes. As discussed above, the core could be reallocated from the set of cores allocated to the set of data message processing processes to the set of cores allocated to the other processes or can be reallocated to a set of inactive cores.

After determining (at 810) that the new allocation removes a core from the first set of cores, the process 800 updates (at 820) the load balancing operation to load balance over the remaining cores. In some embodiments, such as in the example of FIG. 7, the number of queues may not change, and updating the load balancing operation is replaced by updating the assignment of the queues to cores. This updated queue assignment provides the data messages distributed to the queues to cores that remain in the set of cores allocated to the set of data message processing processes.

Once the load balancing operation has been updated (at 820), the process 800 determines (at 830) that the data messages in queues associated with the cores removed from the set of cores allocated to the set of data message processing processes have been processed. In determining that the data messages in the queues have been processed, the process 800 must wait for the associated cores to complete processing the data messages that were distributed to the queues before updating the load balancing operation. If the queues are reassigned as in FIG. 7, instead of waiting for them to empty, they are merely reassigned without having to wait for all of the data messages to be processed as new data messages will continue to be added to the queues.

Once the queues have been emptied, the cores are reallocated (at 840) and the threads are inactivated (e.g., parked). In some embodiments, reallocating the cores includes reassigning the cores to different control groups (e.g., Linux® cgroups). In some situations, the reallocation includes putting the cores in an inactive mode, while in others the reallocation includes reallocating the cores from a group of cores allocated to a set of data message processing processes to a set of cores allocated to the set of other processes.

FIG. 9 conceptually illustrates a process 900 for updating the allocation of cores when cores are added to the set of cores allocated to the data message processing processes. Process 900 begins by determining (at 910) that the new allocation adds a core to the set of cores allocated to the set of data message processing processes. In some situations, the new allocation adds a core because the set of data message processing processes is utilizing the allocated cores above a threshold rate and either (1) the cores allocated to the other processes are utilized at a rate below a threshold rate, or (2) there are cores that are inactive that can be activated to be allocated to the set of data message processing processes.

Once it is determined (at 910) that the new allocation adds a core to the cores allocated to the set of data message processing processes, the cores are reallocated (at 920) and related threads and queues are activated (e.g., taken out of a parked state). In these embodiments, the cores and threads are reallocated and reactivated before updating (at 930) the load balancing operation (e.g., by updating an RSS table). The cores are reallocated before updating the load balancing in order for the cores to be available once data messages are distributed to the queues by the updated load balancing operation. In embodiments such as that described in FIG. 7, some queues may not need to be reactivated, but are instead redirected to the reallocated cores (e.g., if allocation 702 transitions to allocation 701).

Figure 10:
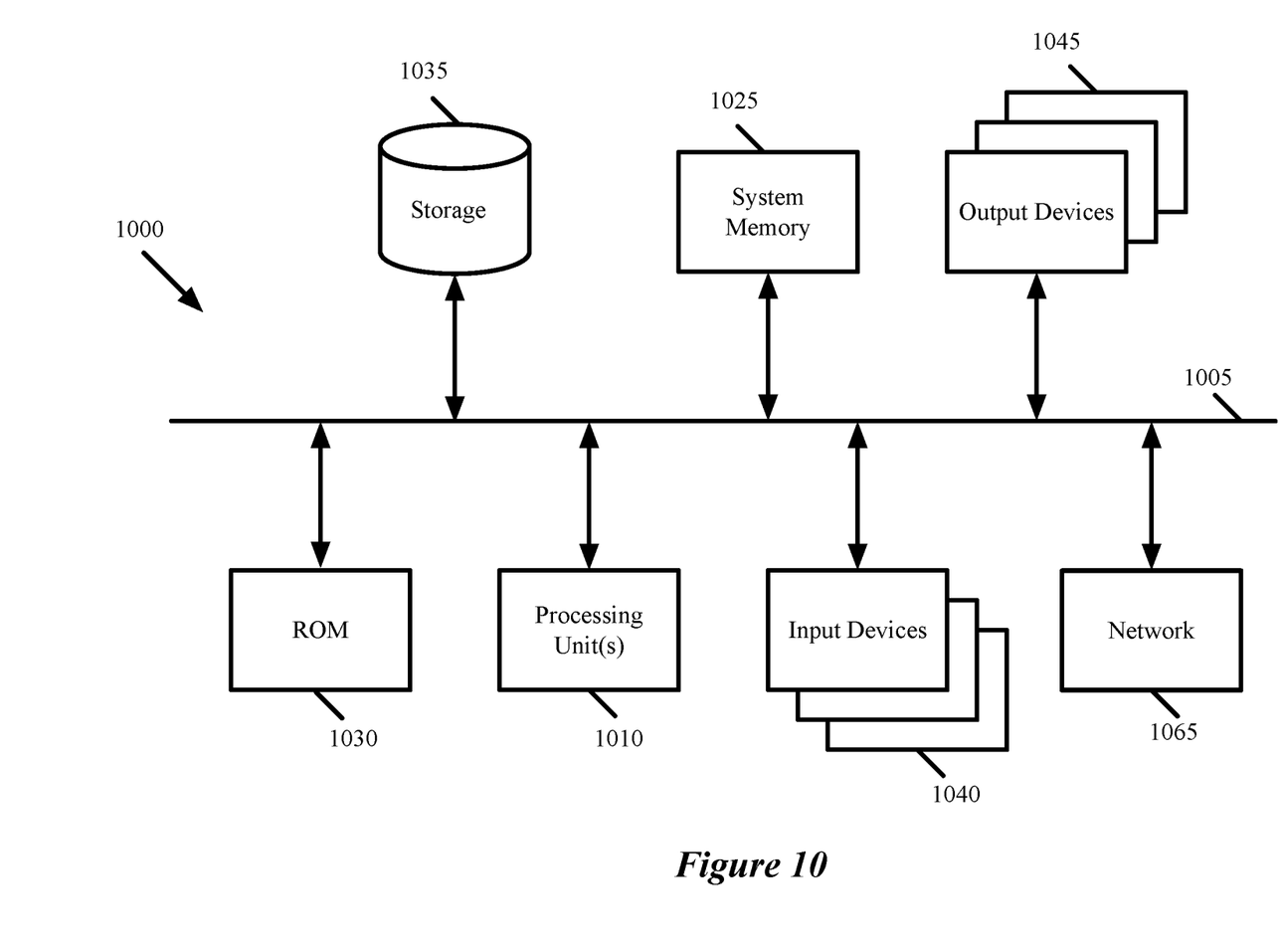
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory 1025 is a volatile read-and-write memory, such as a random-access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"). The output devices 1045 display images generated by the electronic system. The output devices 1045 include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 1, 8, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for updating a core allocation among a plurality of threads of a gateway datapath that executes on a gateway computing device comprising a plurality of cores, the method comprising:
    based on a set of data regarding usage of the plurality of cores during a first core allocation that allocates (i) a first set of cores to data message processing threads of the gateway datapath and (ii) a second set of cores to additional gateway datapath threads, determining a second core allocation that allocates (i) a third set of cores to the data message processing threads of the gateway datapath and (ii) a fourth set of cores to the additional gateway datapath threads, wherein the third set of cores has a different number of cores than the first set of cores and the fourth set of cores has a different number of cores than the second set of cores;
    updating a load balancing operation to load balance received data messages over the third set of cores rather than the first set of cores; and
    reallocating the plurality of cores from the first core allocation to the second core allocation,
    wherein each core in a fifth set of cores is assigned a different one of the data message processing threads of the gateway datapath, the fifth set of cores comprising (i) each core in the first set of cores and at least a subset of cores in the second set of cores and (ii) each core in the third set of cores and at least a subset of cores in the fourth set of cores, wherein the data message processing threads assigned to cores in the second set of cores are inactive during the first core allocation and the data message processing threads assigned to cores in the fourth set of cores are inactive during the second core allocation.

2. The method of claim 1, wherein the third set of cores comprises all of the cores in the first set of cores and one or more additional cores from the second set of cores.

3. The method of claim 2, wherein:
    each core in the fifth set of cores is eligible to be allocated to the data message processing threads;
    each core eligible to be allocated to the data message processing threads is associated with a corresponding queue; and
    the data message processing threads comprise one data message processing thread corresponding to each core in the fifth set of cores.

4. The method of claim 3, wherein the data message processing threads corresponding to the one or more additional cores are in an inactive state before the reallocation of the plurality of cores from the first core allocation to the second core allocation.

5. The method of claim 4, wherein the reallocation of the plurality of cores occurs prior to the updating of the load balancing operation so as to avoid the load balancing operation assigning received data messages to an inactive data message processing thread.

6. The method of claim 4, wherein reallocating the plurality of cores from the first core allocation to the second core allocation comprises activating the data message processing threads corresponding to the one or more additional cores.

7. The method of claim 1, wherein the fourth set of cores comprises all of the cores in the second set of cores and one or more additional cores from the first set of cores.

8. The method of claim 7, wherein:
    each core in the fifth set of cores is eligible to be allocated to the data message processing threads;
    each core eligible to be allocated to the data message processing threads is associated with a corresponding queue; and
    the data message processing threads comprise one data message processing thread corresponding to each core in the fifth set of cores.

9. The method of claim 8, wherein, after updating the load balancing operation, all data messages previously assigned by the load balancing operation to a set of queues that are (i) associated with cores of the first set of cores and (ii) associated with cores in the fourth set of cores are processed before reallocating the one or more additional cores from the first set of cores to the fourth set of cores.

10. The method of claim 9, wherein the data message processing threads associated with the one or more additional cores are deactivated after the data messages assigned to the set of queues are processed by the data message processing threads associated with the one or more additional cores before reallocating the cores from the first set of cores to the fourth set of cores.

11. The method of claim 1, wherein:
    the load balancing operation is a receive side scaling (RSS) operation that distributes received data messages over a set of queues corresponding to the set of cores allocated to the data message processing threads; and
    updating the load balancing operation comprises updating a table associated with the RSS operation.

12. The method of claim 1, wherein the set of data regarding usage of the plurality of cores comprises information regarding one or more types of data messages being received by the gateway datapath.

13. The method of claim 12, wherein determining the second core allocation based on the information regarding one or more types of data messages being received by the gateway datapath comprises projecting a utilization of cores in the second set of cores.

14. The method of claim 1, wherein the set of data regarding usage of the plurality of cores comprises utilization statistics for the first and second sets of cores.

15. The method of claim 14, wherein the utilization statistics received for the first and second sets of cores are used to calculate first and second aggregate core utilization for the first and second sets of cores respectively.

16. The method of claim 14, wherein the utilization statistics are received through a control plane.

17. The method of claim 14, wherein determining the second core allocation comprises:
    determining that one of the first and second sets of cores is being utilized below a threshold rate; and
    identifying the second core allocation as a core allocation that allocates a core from the set of cores being utilized below the threshold rate to the other set of cores of the first and second sets of cores.

18. A non-transitory machine readable medium storing a program for updating a core allocation among a plurality of threads of a gateway datapath that executes on a gateway computing device comprising a plurality of cores, the program for execution by a set of processing units of the gateway computing device, the program comprising sets of instructions for:

based on a set of data regarding usage of the plurality of cores during a first core allocation that allocates (i) a first set of cores to data message processing threads of the gateway datapath and (ii) a second set of cores to additional gateway datapath threads, determining a second core allocation that allocates (i) a third set of cores to the data message processing threads of the gateway datapath and (ii) a fourth set of cores to the additional gateway datapath threads, wherein the third set of cores has a different number of cores than the first set of cores and the fourth set of cores has a different number of cores than the second set of cores;

updating a load balancing operation to load balance received data messages over the third set of cores rather than the first set of cores; and reallocating the plurality of cores from the first core allocation to the second core allocation, wherein each core in a fifth set of cores is assigned a different one of the data message processing threads of the gateway datapath, the fifth set of cores comprising (i) each core in the first set of cores and at least a subset of cores in the second set of cores and (ii) each core in the third set of cores and at least a subset of cores in the fourth set of cores, wherein the data message processing threads assigned to cores in the second set of cores are inactive during the first core allocation and the data message processing threads assigned to cores in the fourth set of cores are inactive during the second core allocation.

19. The non-transitory machine readable medium of claim 18, wherein:

the load balancing operation is a receive side scaling (RSS) operation that distributes received data messages over a set of queues corresponding to the set of cores allocated to the data message processing threads; and the set of instructions for updating the load balancing operation comprises a set of instructions for updating a table associated with the RSS operation.

20. The non-transitory machine readable medium of claim 18, wherein the set of data regarding usage of the plurality of cores comprises information regarding one or more types of data messages being received by the gateway datapath.

21. The non-transitory machine readable medium of claim 20, wherein the set of instructions for determining the second core allocation based on the information regarding one or more types of data messages being received by the gateway datapath comprises a set of instructions for projecting a utilization of cores in the second set of cores.

22. The non-transitory machine readable medium of claim 18, wherein the set of data regarding usage of the plurality of cores comprises utilization statistics for the first and second sets of cores.

23. The non-transitory machine readable medium of claim 22, wherein the utilization statistics received for the first and second sets of cores are used to calculate first and second aggregate core utilization for the first and second sets of cores respectively.

24. The non-transitory machine readable medium of claim 22, wherein the set of instructions for determining the second core allocation comprises sets of instructions for:

determining that one of the first and second sets of cores is being utilized below a threshold rate; and identifying the second core allocation as a core allocation that allocates a core from the set of cores being utilized below the threshold rate to the other set of cores of the first and second sets of cores.

25. The non-transitory machine readable medium of claim 18, wherein:

each core in the fifth set of cores is eligible to be allocated to the data message processing threads; and each core eligible to be allocated to the data message processing threads is associated with a corresponding queue.

* * * * *